J. W. SEFTON.
Churn.
No. 53,380.
Patented March 20, 1866.
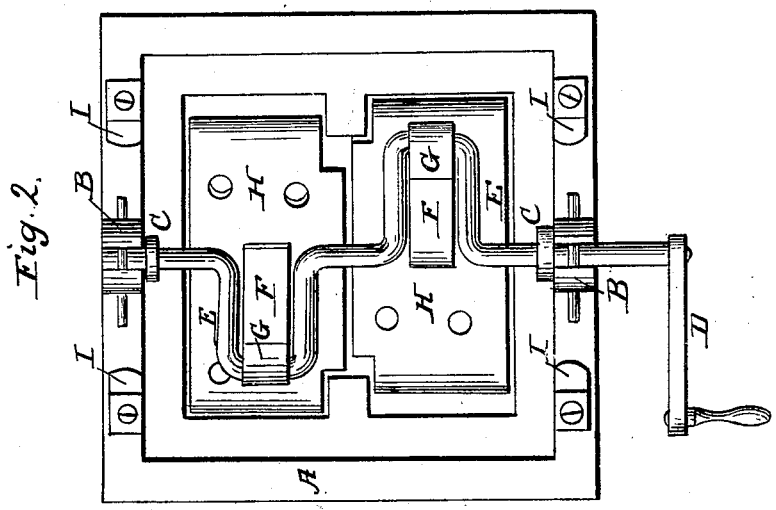
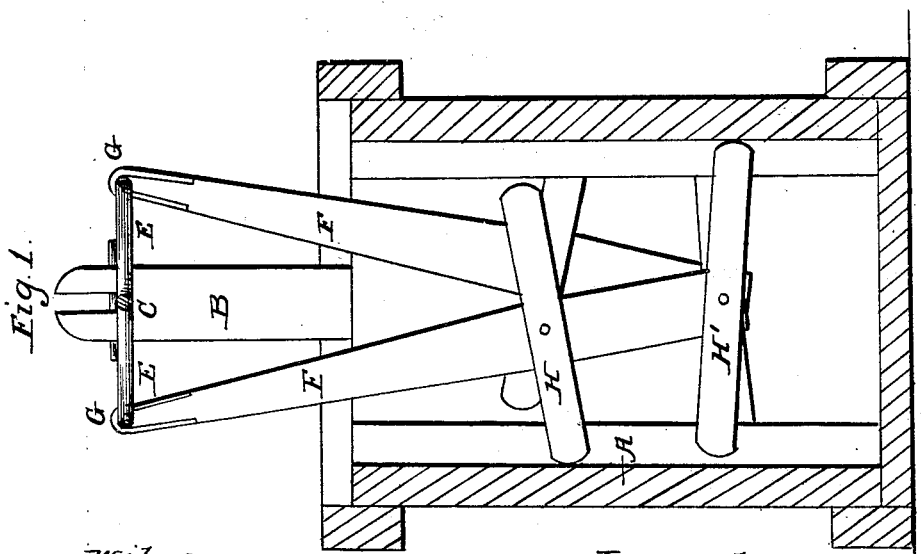

UNITED STATES PATENT OFFICE.

JOSIAH W. SEFTON, OF GETTYSBURG, PENNSYLVANIA, ASSIGNOR TO HIMSELF AND JAMES McCREARY, OF SAME PLACE.

IMPROVEMENT IN CHURNS.

Specification forming part of Letters Patent No. 53,380, dated March 20, 1866.

*To all whom it may concern:*

Be it known that I, JOSIAH W. SEFTON, of Gettysburg, in the county of Adams and State of Pennsylvania, have made a new and useful Improvement in Churns; and I do hereby declare the following to be a full, clear, and exact description of the nature, construction, and operation of the same, sufficient to enable one skilled in the art to which it appertains to construct and use the same, reference being had to the accompanying drawings, which are made part of this specification, and in which—

Figure 1 is a vertical section of the same. Fig. 2 is a plan or top view, the lid being removed.

The churn consists of a pair of reciprocating dasher-shafts, each carrying a pair of pivoted and perforated dashers, which, by the vertical and oscillating movements of the dasher-shaft, are caused to rock as they alternately rise and descend in the churn, being guided in their vertical motions by a cleat, which keeps them from interference.

A is the body of the churn, upon which are the standards B B, in which the crank-shaft C is journaled, and in which it revolves under the impulse of the crank D.

The crank-shaft has opposite cranks, E E, to which are attached the dasher-shafts F F, which are confined thereto by the straps G G, or in any other suitable manner. To each of these dasher-shafts are pivoted two dashers, H H', whose independence of motion on the shafts enables them in their ascent and descent, but especially the latter, to assimilate their position to the level of the cream in the churn, as it is an object to give the cream a blow which will scatter and disperse it around the edge of the dasher and through the holes in the same, which is an effective action upon the cream.

The dashers are allowed to accommodate themselves in their vertical motions to the impression of the fluid in which they operate, the main effect in this respect being as they descend to slap upon the surface of the cream, causing it to scatter in every available direction.

The lid of the churn is fastened thereto by the buttons I I, and is in such sections as may be conveniently applicable thereto, allowing openings for the passage through it of the dasher-shafts F F.

The above-described churn is a practical success, and has proved very speedy and effective.

Having described my invention, what I claim therein as new, and desire to secure by Letters Patent, is—

The arrangement of the pivoted dashers H H', the dasher-shafts F F, and the double crank-shaft C E E, the whole operating substantially as described and represented.

JOSIAH W. SEFTON.

Witnesses:
JAMES McCREARY,
A. J. COVER.